United States Patent
Matsubara et al.

(10) Patent No.: US 9,970,077 B2
(45) Date of Patent: May 15, 2018

(54) METHOD FOR ADDING STARTING MATERIAL SLURRY AND SULFURIC ACID TO AUTOCLAVE IN HIGH PRESSURE ACID LEACHING PROCESS AND AUTOCLAVE

(71) Applicant: SUMITOMO METAL MINING CO., LTD., Tokyo (JP)

(72) Inventors: Satoshi Matsubara, Tokyo (JP); Osamu Nakai, Tokyo (JP); Yoji Kyoda, Tokyo (JP); Takashi Sakamoto, Tokyo (JP); Koichiro Maki, Ehime (JP); Masaki Kitahara, Ehime (JP); Haruo Ishikawa, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 174 days.

(21) Appl. No.: 14/396,300

(22) PCT Filed: Apr. 15, 2013

(86) PCT No.: PCT/JP2013/061158
§ 371 (c)(1),
(2) Date: Oct. 22, 2014

(87) PCT Pub. No.: WO2013/161599
PCT Pub. Date: Oct. 31, 2013

(65) Prior Publication Data
US 2015/0086450 A1    Mar. 26, 2015

(30) Foreign Application Priority Data

Apr. 26, 2012  (JP) .................................. 2012-101614
Nov. 28, 2012  (JP) .................................. 2012-260286

(51) Int. Cl.
*C22B 23/00* (2006.01)
*C22B 3/00* (2006.01)
(Continued)

(52) U.S. Cl.
CPC ........ *C22B 23/043* (2013.01); *B01D 11/0257* (2013.01); *B01F 7/00633* (2013.01);
(Continued)

(58) Field of Classification Search
CPC ...... B01J 2219/0078; B01J 2219/00189; B01J 19/0066; B01J 19/18
(Continued)

(56) References Cited

U.S. PATENT DOCUMENTS 3,121,759 A * 2/1964 Slyngstad ............ B01J 19/1862
196/46
3,961,908 A * 6/1976 Touro ........................ C22B 3/00
422/269
(Continued)

FOREIGN PATENT DOCUMENTS

CA    2 799 528 A1   11/2011
DE    10 91 568 B    10/1960
(Continued)

OTHER PUBLICATIONS

Dec. 1, 2015 Extended Search Report issued in European Patent Application No. 13782392.8.
(Continued)

*Primary Examiner* — Steven J Bos
(74) *Attorney, Agent, or Firm* — Oliff PLC

(57) ABSTRACT

In an autoclave in a high pressure acid leaching process in which starting material slurry and sulfuric acid are stirred by stirring machines in each compartment in the autoclave partitioned by partition walls to proceed leaching, and slurry is transferred from a compartment on an upstream side to a compartment on a downstream side to sequentially proceed leaching, wherein starting material slurry supply tubes having the starting material slurry discharge ports and sulfuric acid supply tubes having sulfuric acid discharge ports are
(Continued)

alternately disposed on a perimeter of stirring blades of the stirring machine provided in the compartment at an upstream end, and the starting material slurry and sulfuric acid are added to the compartment at the upstream end from the starting material slurry discharge ports and the sulfuric acid discharge ports positioned higher than an uppermost part of the stirring blades and lower than a contained liquid surface.

4 Claims, 20 Drawing Sheets

(51) Int. Cl.
| | | |
|---|---|---|
| B01F 7/22 | (2006.01) | |
| C22B 3/10 | (2006.01) | |
| B01D 11/02 | (2006.01) | |
| B01F 7/00 | (2006.01) | |
| B01F 7/16 | (2006.01) | |
| B01F 13/10 | (2006.01) | |
| B01F 15/00 | (2006.01) | |
| B01F 15/02 | (2006.01) | |
| C22B 3/02 | (2006.01) | |
| B01J 19/00 | (2006.01) | |
| B01J 19/18 | (2006.01) | |
| B01J 3/04 | (2006.01) | |

(52) U.S. Cl.
CPC ............... *B01F 7/167* (2013.01); *B01F 7/22* (2013.01); *B01F 13/1016* (2013.01); *B01F 15/00883* (2013.01); *B01F 15/0203* (2013.01); *B01F 15/0277* (2013.01); *B01J 3/04* (2013.01); *B01J 19/006* (2013.01); *B01J 19/0066* (2013.01); *B01J 19/1806* (2013.01); *B01J 19/1862* (2013.01); *C22B 3/02* (2013.01); *C22B 3/10* (2013.01); *B01J 2208/00548* (2013.01); *B01J 2219/00768* (2013.01); *Y02P 10/234* (2015.11)

(58) Field of Classification Search
USPC ............ 266/168; 422/226, 187; 75/710–745
See application file for complete search history.

(56) References Cited

U.S. PATENT DOCUMENTS

| | | | | |
|---|---|---|---|---|
| 4,606,763 | A | * | 8/1986 | Weir .................. C22B 3/02 266/168 |
| 5,071,477 | A | * | 12/1991 | Thomas .................. C22B 11/08 423/29 |
| 5,575,981 | A | | 11/1996 | Krause |
| 5,856,533 | A | | 1/1999 | Sweeney et al. |
| 6,299,776 | B1 | * | 10/2001 | McWhirter ............. C02F 3/121 210/205 |
| 6,368,381 | B1 | | 4/2002 | King et al. |
| 6,835,230 | B2 | * | 12/2004 | Kanno ..................... C22B 3/08 241/20 |
| 7,604,783 | B2 | * | 10/2009 | King ..................... C22B 3/08 423/29 |
| 7,635,407 | B2 | * | 12/2009 | Dunn ..................... C22B 3/02 75/743 |
| 8,061,888 | B2 | * | 11/2011 | Ji ........................ B01F 7/00975 366/155.1 |
| 2007/0217285 | A1 | | 9/2007 | Ji et al. |

FOREIGN PATENT DOCUMENTS

| | | |
|---|---|---|
| GB | 808 609 A | 2/1959 |
| JP | B2-7-84623 | 5/1986 |
| JP | A-2-197533 | 8/1990 |
| JP | A-2005-350766 | 12/2005 |
| JP | A-2009-515044 | 4/2009 |
| JP | A-2009-530077 | 8/2009 |
| JP | A-2011-241446 | 12/2011 |
| WO | 2011/147867 A1 | 12/2011 |

OTHER PUBLICATIONS

International Search Report issued in International Application No. PCT/JP2013/061158 dated May 14, 2013.
Dec. 22, 2017 Office Action issued in European Patent Application No. 13782392.8.

* cited by examiner

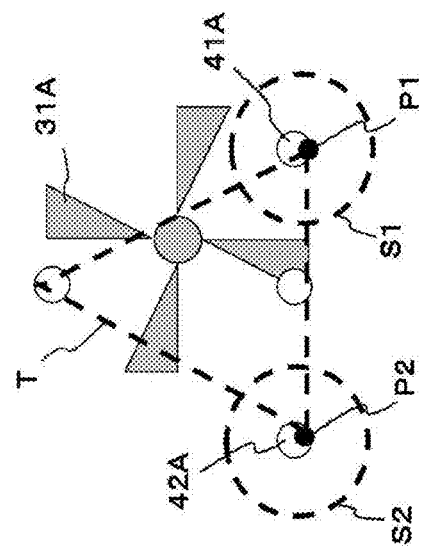
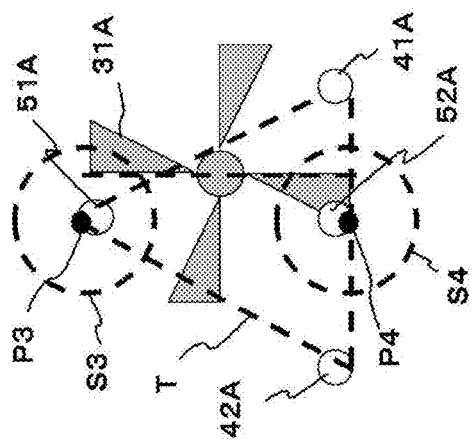
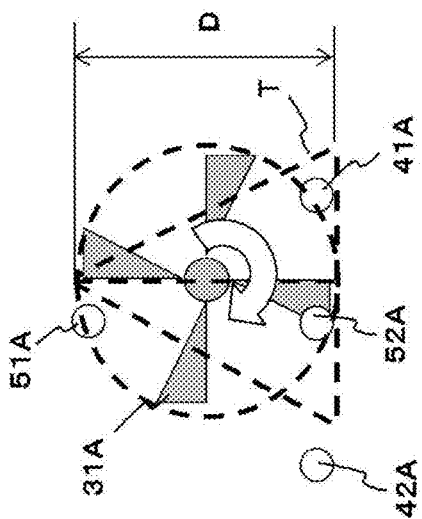
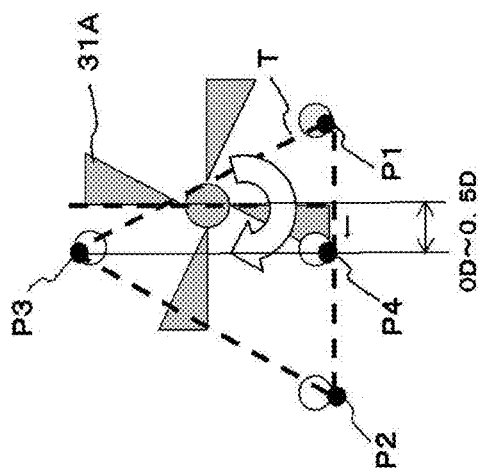
FIG.2A
FIG.2B
FIG.2C
FIG.2D

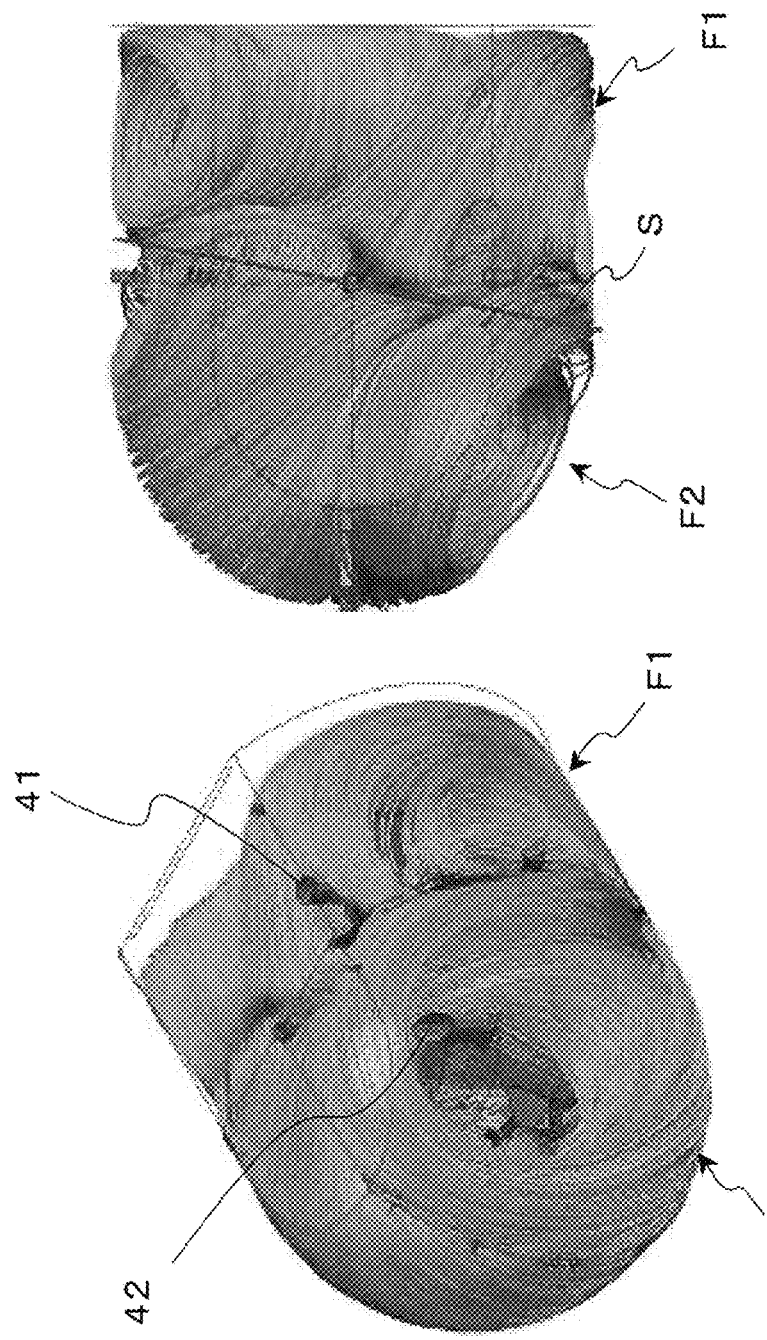

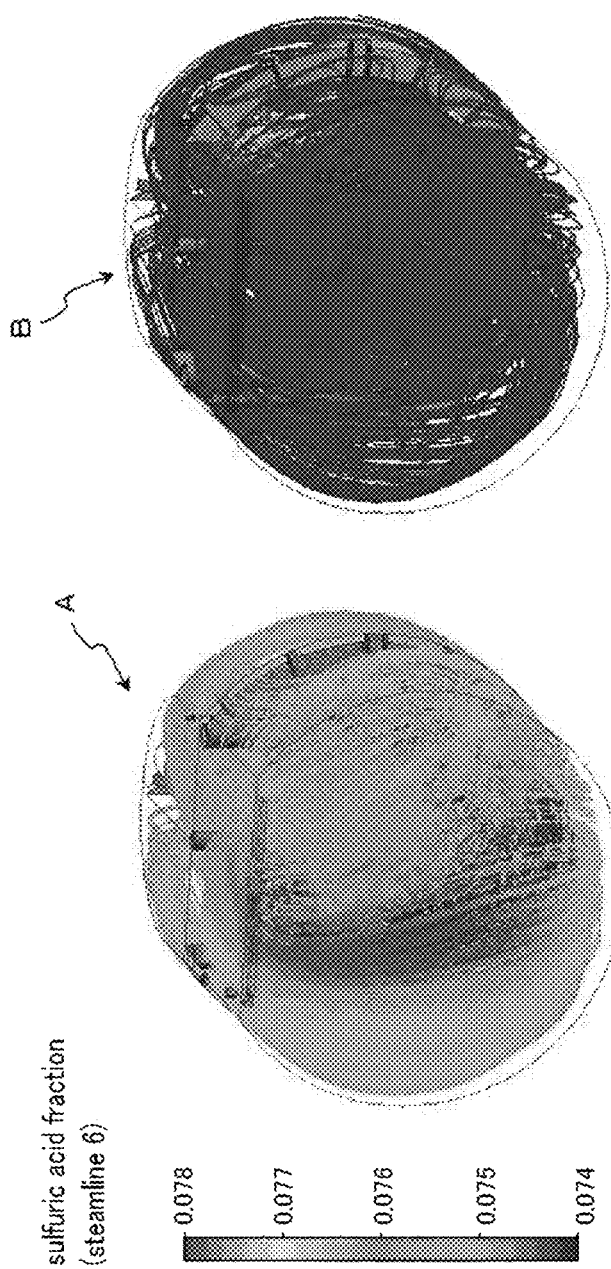

METHOD FOR ADDING STARTING MATERIAL SLURRY AND SULFURIC ACID TO AUTOCLAVE IN HIGH PRESSURE ACID LEACHING PROCESS AND AUTOCLAVE

FIELD OF THE INVENTION

This invention relates to a method for adding starting material slurry and sulfuric acid to an autoclave in a high pressure acid leaching process in which the starting material slurry is leached by the autoclave (high pressure reaction vessel) under high temperature and high pressure and the slurry after leaching are lowered to normal temperature and normal pressure in a flash vessel (temperature and pressure lowering vessel). The present application asserts priority rights based on JP Patent Application 2012-101614 filed in Japan on Apr. 26, 2012 and JP Patent Application 2012-260286 filed in Japan on Nov. 28, 2012. The total contents of disclosure of the Patent Application of the senior filing date are to be incorporated by reference into the present Application.

In recent years, with the development of a material with anti-corrosion characteristics under high temperature and high pressure, a High Pressure Acid Leach (HPAL) method using sulfuric acid has attracted attention as a wet smelting method for nickel oxide ore. Unlike a dry smelting method, which is a conventional general smelting method for nickel oxide ore, this method does not include a dry process such as a reducing and drying process but includes consistent wet processes, and therefore is advantageous in energy and cost. That is, in the above-described high pressure acid leaching method, by controlling the oxidation-reaction potential and temperature of a leachate in a pressuring and leaching reaction vessel in a leaching process, iron as main impurities is fixed in leaching residues in a form of hematite ($Fe_2O_3$). Thus, nickel and cobalt can be selectively leached with respect to iron, which is an enormous merit.

For example, as a wet smelting method for nickel oxide ore, a high pressure acid leaching method using an autoclave is adopted.

The high pressure acid leaching method for obtaining nickel-cobalt mixed sulfide includes, for example, as depicted in FIG. 19, a pre-processing process (1), a high pressure acid leaching process (2), a solid-liquid separating process (3), a neutralizing process (4), a dezincifying process (5), and a sulfurizing process (6), and a detoxifying process (7) (for example, refer to PTL 1).

In the pre-processing process (1), nickel oxide ore is crushed and classified by using a pulverizing facility and a sorting facility to prepare starting material slurry with a predetermined slurry concentration including ores 2 mm or less. The starting material slurry is supplied to the next high pressure acid leaching process (2).

In the high pressure acid leaching process (2), the temperature and pressure of the starting material slurry obtained in the pre-processing process (1) are increased by a pre-heater (temperature and pressure increasing facility) in a stepwise manner, and the resulting starting material slurry is then supplied to the autoclave. In the autoclave, sulfuric acid with its temperature and pressure increased in a similar manner is added to the starting material slurry, stirring is performed at 220 degrees Celsius to 280 degrees Celsius for high pressure acid leaching of valuable metal, and the temperature and pressure of the obtained leached slurry are lowered to normal temperature and normal pressure in a flash vessel.

In the solid-liquid separating process (3), the leached slurry of the valuable metal obtained in the leaching process (2) is subjected to solid-liquid separation to obtain a leachate containing nickel and cobalt as valuable metals (crude nickel sulfate aqueous solution) and leaching residues.

In the neutralizing process (4), the leachate obtained in the solid-liquid separating process (3) is neutralized.

In the dezincifying process (5), hydrogen sulfide gas is added to the leachate neutralized in the neutralizing process (4) to precipitate and remove zinc as zinc sulfide.

In the sulfurizing process (6), hydrogen sulfide gas is added to the dezincified finish solution obtained in the dezincifying process (5) to obtain a nickel-cobalt complex sulfide and nickel barren solution.

In the detoxifying process (7), the leaching residues generated in the solid-liquid separating process (3) and the nickel barren solution generated in the sulfurizing process (6) are detoxified.

Here, in the autoclave in the high pressure acid leaching process (2), the heated and pressurized starting material slurry and sulfuric acid, are supplied to a first compartment in the autoclave partitioned into plurality by partition walls, and are stirred by a stirring machine provided to the first compartment to proceed leaching. The slurry is transferred to a second compartment onward by overflow, thereby further promoting leaching sequentially in a similar method.

Meanwhile, to supply the above-described starting material slurry and sulfuric acid to the autoclave, expensive piping resistant to pressure and corrosion is required, and many valves for operation are also provided. In view of reduction in cost and in order to ensure favorable operability, the shortest and simple arrangement is generally adopted.

For example, the structure of the first compartment in the conventional autoclave is schematically depicted in FIG. 20A, FIG. 20B, and FIG. 20C as a cross-section, a longitudinal section, and a side section, respectively. In a compartment 210 of an autoclave 200, stirring blades 231 of a stirring machine 230 is installed at the center, and starting material slurry addition pipes 241 and 242 and sulfuric acid addition pipes 251 and 252 are disposed at positions closest to both sides of an autoclave body when viewed in the cross-section of FIG. 20A.

As such, by setting positions closest to the both sides of the autoclave body as adding positions, pipes to these positions can be shortened, and the pipes do not cross or overlap with each other. Therefore, easy recognition by an operator and favorable operability can be ensured.

However, even with many partitions, the leaching ratio in the autoclave is not 100%, and excessive sulfuric acid more than appropriate to valuable metals in the starting material slurry is fed into the autoclave. The sulfuric acid amount of this excessive portion is controlled with the amount of free sulfuric acid (unreacted sulfuric acid remaining in the above-described leachate) to maintain a predetermined leaching ratio in operation (normally 90% to 95%), and normally has a value on the order of 50 g/L to 55 g/L.

Also, since the leachate obtained in the solid-liquid separating process (3) is neutralized in the next neutralizing process (4), free sulfuric acid is neutralized without contributing to leaching, which is wasteful. Moreover, since cost of a neutralizer for neutralization is also required, the amount of free sulfuric acid is desired to be decreased no matter to how small a degree. Under present circumstances, however, the above-described amount of free sulfuric acid has to be used to maintain a predetermined leaching ratio.

For example, a technique has been suggested in which an optimum temperature condition is maintained in the first compartment in the autoclave by a contrivance, such as maintaining reactive slurry with a capacity larger by 50% to 200% than the capacity of reactive slurry in any compartment on a downstream side, without external heating or cooling (for example, refer to PTL 2).

A technique has also been suggested in which sulfuric acid is regenerated by performing successive two or more leaching stages in a composite manner including a normal pressure leaching stage and a pressurized leaching stage to reduce a great deal of the added sulfuric acid amount (for example, refer to PTL 3).

However, since the disclosed technique of the above-described PTL 2 is targeted for a sulfide material and the disclosed technique of PTL 3 requires a normal pressure leaching process, these techniques cannot be applied to the above-described problems.

PRIOR-ART DOCUMENTS

Patent Documents

PTL 1: Japanese Patent Application Laid-Open No. 2005-350766
PTL 2: Japanese Examined Patent Publication No. 07-084623
PTL 3: Japanese Translation of PCT International Application Publication No. 2009-515044

SUMMARY OF THE INVENTION

In view of the conventional problems as described above, an object of the present invention is to provide a method for adding starting material slurry and sulfuric acid to an autoclave capable of promoting mixing of the starting material slurry and sulfuric acid and reducing a control value of concentration of free sulfuric acid after discharge in a high pressure acid leaching process.

Other objects of the present invention and specific advantages obtained by the present invention will become more apparent from description of an embodiment, which will be described below.

To achieve the above-described object, the inventors have studied a mixing state of starting material slurry and sulfuric acid in an autoclave for use in high pressure acid leaching of nickel oxide ore without sticking to only piping cost or operability, and thereby found specific effective adding positions and completed the present invention.

That is, by defining positions of adding starting material slurry and sulfuric acid, a leaching ratio similar to a conventional one can be maintained even a free acid amount, which is a control value of autoclave finish solution, is reduced.

The present invention provides a method for adding starting material slurry and sulfuric acid to an autoclave in a high pressure acid leaching process in which the starting material slurry and the sulfuric acid are heated and pressurized and stirred by a stirring machine provided in each of compartments in the autoclave partitioned into plurality by partition walls to proceed leaching, and slurry is transferred from a compartment on an upstream side to a compartment on a downstream side to sequentially proceed leaching, wherein via starting material slurry supply tubes having the starting material slurry discharge ports and sulfuric acid supply tubes having sulfuric acid discharge ports alternately disposed on a perimeter of stirring blades of the stirring machine provided in a compartment at an upstream end of the autoclave, the starting material slurry and the sulfuric acid are added to the compartment at the upstream end from the starting material slurry discharge ports and the sulfuric acid discharge ports positioned at positions higher than an uppermost part of the stirring blades and lower than a contained liquid surface.

Also, the present invention provides an autoclave in a high pressure acid leaching process in which heated and pressurized starting material slurry and sulfuric acid are stirred by a stirring machine provided in each of compartments in the autoclave partitioned into plurality by partition walls to proceed leaching, and slurry is transferred from a compartment on an upstream side to a compartment on a downstream side to sequentially proceed leaching, wherein starting material slurry supply tubes having the starting material slurry discharge ports and sulfuric acid supply tubes having sulfuric acid discharge ports are alternately disposed on a perimeter of stirring blades of the stirring machine provided in a compartment at an upstream end, and the starting material slurry discharge ports and the sulfuric acid discharge ports are positioned at positions higher than an uppermost part of the stirring blades and lower than a contained liquid surface, and via the starting material slurry supply tubes and the sulfuric acid supply tubes, the starting material slurry and the sulfuric acid are added to the compartment at the upstream end from the starting material slurry discharge ports and the sulfuric acid discharge ports alternately positioned on the perimeter of the stirring blades and at positions higher than the uppermost part of the stirring blades of the stirring machine and lower than the contained liquid surface.

In the present invention, the starting material slurry and the sulfuric acid can be added to the compartment at the upstream end from the starting material slurry discharge ports and the sulfuric acid discharge ports, with the starting material slurry discharge ports and the sulfuric acid discharge ports being positioned at planar positions, the starting material slurry discharge ports being positioned in a range of a distance of 0.25 D from, as centers, apex positions at both ends of a bottom side of a regular triangle with a height being any diameter D of a circle formed by tips of the stirring blades, the regular triangle moved by distance of 0 D to 0.5 D so that the regular triangle has a midpoint of the bottom side positioned in a length direction of the bottom side of the regular triangle and on a downstream side of a rotating direction of the stirring blades, and the sulfuric acid discharge ports being positioned in a range of a distance of 0.25 D of the diameter from, as centers, the midpoint position of the bottom side and the remaining apex position of the regular triangle.

The length direction of the bottom side of the regular triangle can be, for example, parallel to a side wall of the autoclave.

EFFECTS OF INVENTION

According to the present invention, it is possible to provide a method for adding starting material slurry and sulfuric acid to an autoclave capable of promoting mixing of the starting material slurry and sulfuric acid and reducing a control value of concentration of free sulfuric acid after discharge in a high pressure acid leaching process, and also possible to provide the autoclave.

BRIEF DESCRIPTION OF DRAWINGS

The patent or application file contains at least one drawing executed in color. Copies of this patent or patent application publication with color drawings will be provided by the Office upon request and payment of the necessary fee.

FIG. 1 depicts an example of structure of main parts of an autoclave to which the present invention is applied, in which

FIG. 2 schematically depicts a procedure of determining positions of starting material slurry discharge ports and acid discharge ports in the above-described autoclave, in which FIG. 2A, FIG. 2B, FIG. 2C, FIG. 2D schematically depict each position in the course of the procedure.

FIG. 5 depicts simulation models of arrangement of slurry supply tubes, in which

FIG. 6 depicts results of simulations indicated by flow lines which visualize flows created only by rotational force of stirring blades in the above-described autoclave, in which

FIG. 7 depicts results of a simulation indicated by flow lines which visualize flows in an autoclave provided with slurry supply tubes, in which FIG. 7A depicts a state of flows in the compartment at the upstream end viewed from the oblique above and FIG. 7B depicts the state viewed from straight above.

FIG. 8 depicts results of a simulation indicated by flow lines which visualize flows of slurry in the compartment at the upstream end, in which

FIG. 10 depicts residence time distribution curves of slurry in the above-described models A and B, in which

FIG. 11 depicts residence time distribution curves of sulfuric acid in the above-described models A and B, in which

FIG. 12 depicts results obtained by performing a simulation indicated by flow lines which visualize flows in the compartment at the upstream end and comparing residence times of slurry near the partition wall, in which

FIG. 14 depicts results of a simulation in which flow lines near the partition wall are colored with sulfuric acid concentrations for comparison, in which FIG. 14A depicts sulfuric acid concentrations near the partition wall in the above-described model A and FIG. 14B depicts sulfuric acid concentrations near the partition wall in the above-described model B.

FIG. 15 depicts results of simulations of flows of sulfuric acid in a model C including long sulfuric acid supply tubes and in a model D including short sulfuric acid supply tubes, with the number of revolutions of stirring blades being set at 60.5 rpm, in which

FIG. 17 depicts temperature contours of buffles and stirring blades depending on the length of sulfuric acid supply tubes, in which

FIG. 20 depicts a schematic structure of a general autoclave, in which

DETAILED DESCRIPTION OF THE INVENTION

An embodiment of the present invention is described in detail below with reference to the drawings.

<Structure of Autoclave>

The present invention is implemented by an autoclave 100 with a structure depicted in FIG. 1, for example.

Figure 1A:
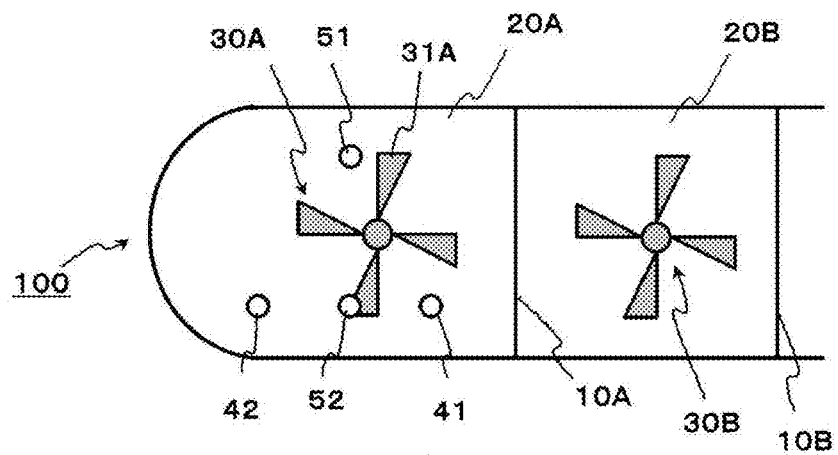
FIG. 1A is a plan view schematically depicting the inner structure of the autoclave as being horizontally cut.
Figure 1B:
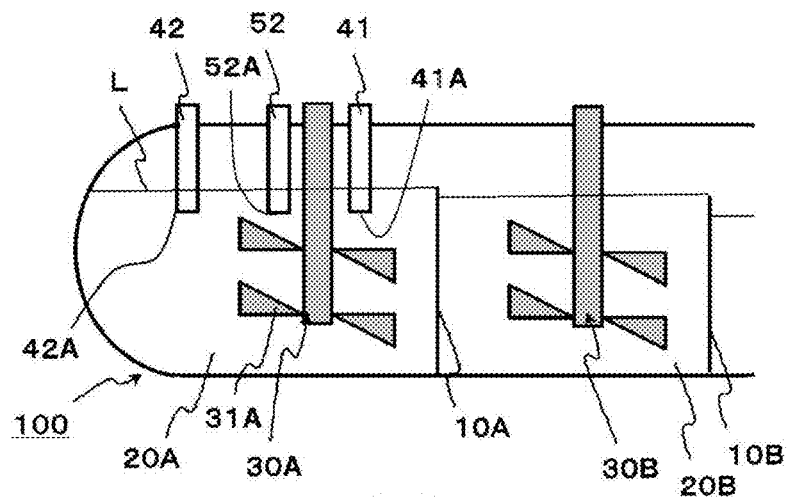
FIG. 1B is a side view schematically depicting the inner structure of the autoclave as being vertically cut.
Figure 1C:
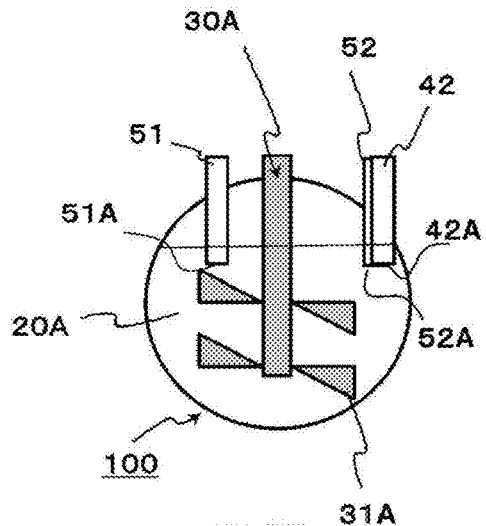
FIG. 1C is a front view schematically depicting the inner structure of the autoclave as being vertically cut.

FIG. 1 depicts the structure of main parts of the autoclave 100, in which FIG. 1A is a plan view schematically depicting the inner structure of the autoclave 100 as being horizontally cut, FIG. 1B is a side view schematically depicting the inner structure of the autoclave 100 as being vertically cut, and FIG. 1C is a front view schematically depicting the inner structure of the autoclave 100 as being vertically cut.

This autoclave 100 is an autoclave in a high pressure acid leaching process in which heated and pressurized starting material slurry and sulfuric acid are stirred to perform high temperature pressurized acid leaching of valuable metal, a plurality of compartments 20A, 20B partitioned by partition walls 10A, 10B, . . . are provided in the autoclave, and stirring machines 30A, 30B are installed in each of the compartments 20A, 20B, . . . . In addition, in this autoclave 100, with stirring by the stirring machines 30A, 30B . . . provided to the respective compartments 20A, 20B . . . partitioned by partition walls 10A, 10B, leaching is proceeded to transfer slurry from a compartment on an upstream side to a compartment on a downstream side, and thereby leaching is sequentially proceeded.

Here, the compartment 20A at an upstream end has a shape as coupling a hemisphere and a cylinder, and the compartment 20B in the middle is in a cylindrical shape.

In this autoclave 100, two starting material slurry supply tubes 41 and 42 having starting material slurry discharge ports 41A and 42A, respectively, and two sulfuric acid supply tubes 51 and 52 having sulfuric acid discharge ports 51A and 52A, respectively, are alternately disposed on the perimeter of stirring blades 31A of the stirring machine 30A provided in the compartment 20A at the upstream end. In addition, the above-described starting material slurry discharge ports 41A and 42A and sulfuric acid discharge ports 51A and 52A are positioned higher than an uppermost part of the above-described stirring blades 31A and lower than a contained liquid surface L.

Note that each pipe is inserted from above into the inside of the autoclave 100, and has a vapor pipe at any position for maintaining temperature. Also, in this autoclave 100, the stirring blades 31A provided in the compartment 20A at the upstream end rotate in a clockwise direction to form a downward flow.

Here, in this autoclave 100, the positions of the above-described starting material slurry discharge ports 41A and 42A and sulfuric acid discharge ports 51A and 52A are determined as depicted in FIG. 2, for example.

That is, at planar positions at height positions of the above-described starting material slurry discharge ports 41A and 42A and sulfuric acid discharge ports 51A and 52A, apex positions P1, P2, and P3 and a midpoint position P4 of a bottom side of a regular triangle T with a height being any diameter D of a circle formed by tips of the above-described stirring blades 31A as depicted in FIG. 2A are determined, the regular triangle T moved by a distance of 0 to 0.5 D so that the regular triangle T has the above-described midpoint positioned in a length direction of the bottom side and on a downstream side of a rotating direction of the above-described stirring blades 31A as depicted in FIG. 2B. The above-described starting material slurry discharge ports 41A and 42A are positioned in ranges S1 and S2 a distance of 0.25 D away from the apex positions P1 and P2, respectively, at both ends of the above-described bottom side as centers, as depicted in FIG. 2C. In addition, the above-described sulfuric acid discharge ports 51A and 52A are positioned in ranges S3 and S4 a distance of 0.25 D away from the remaining apex position P3 and the midpoint position P4, respectively, at the above-described bottom side of the above-described regular triangle T as centers, as depicted in FIG. 2D.

Also, the above-described starting material slurry discharge ports 41A and 42A and sulfuric acid discharge ports 51A and 52A are positioned higher than the uppermost part of the above-described stirring blades 31A and lower than the contained liquid surface L.

In addition, in this autoclave 100, starting material slurry and sulfuric acid are added to the above-described compartment 20A at the upstream end via two starting material slurry supply tubes 41 and 42 having the starting material slurry discharge ports 41A and 42A and two sulfuric acid sulfuric supply tubes 51 and 52 having sulfuric acid discharge ports 51A and 52A, these tubes alternately disposed on the perimeter of the stirring blades 31A of the stirring machine 31 provided in the compartment 20A at the upstream end.

Figure 3:
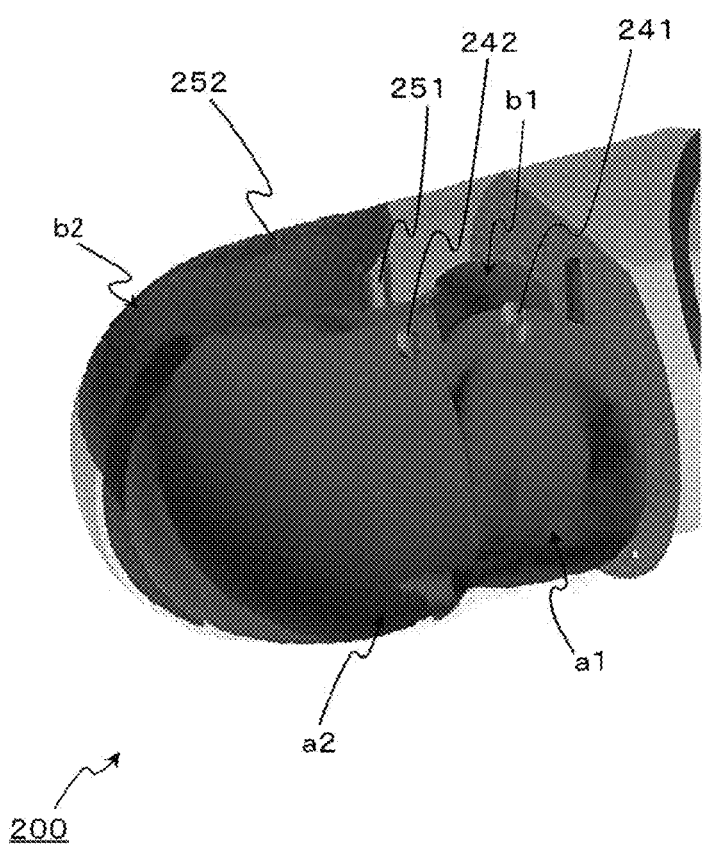
FIG. 3 is a schematic view of stirring simulation results regarding a conventional autoclave before improvement.
Figure 4:
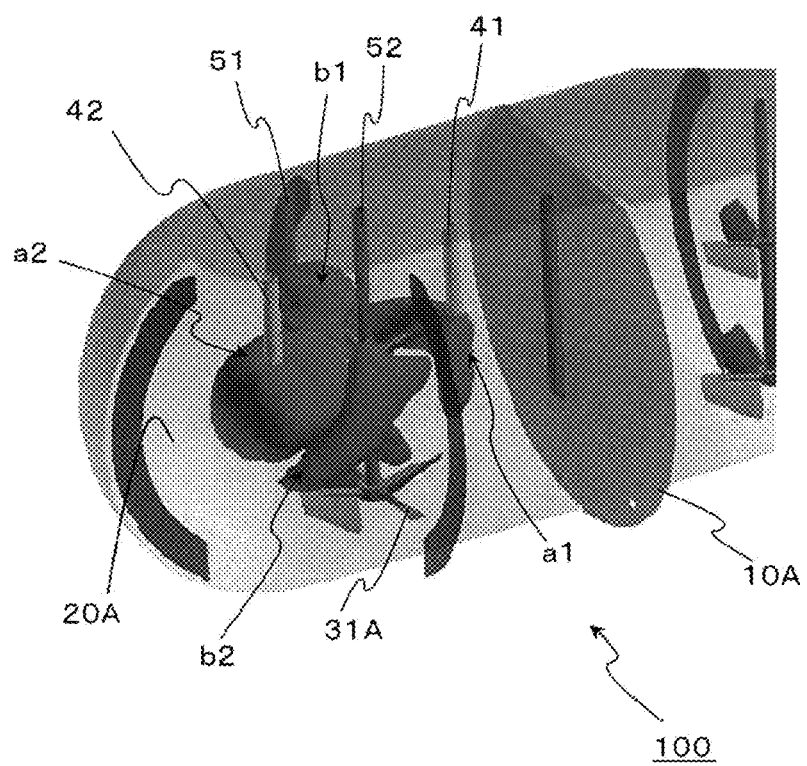
FIG. 4 is a schematic view of stirring simulation results regarding an autoclave to which the present invention is applied.

For the above-structured autoclave 100, a simulation of stirring was performed. As a result, it can be found that while slurry high concentration portions a1 and a2 and sulfuric acid high concentration portions b1 and b2 were widely present in a conventional autoclave before improvement as depicted in FIG. 3 and the autoclave was in a diffusion failure state, the slurry high concentration portions a1 and a2 and the sulfuric acid high concentration portions b1 and b2 were small and effectively diffused in the autoclave 100 to which the present invention is applied, as the simulation result is depicted in FIG. 4.

<Study of Installation Positions of Starting Material Slurry Supply Tubes and Sulfuric Acid Supply Tubes>

Here, to perform a stable autoclave operation, the installation positions of the starting material slurry supply tubes 41 and 42 having the starting material slurry discharge ports 41A and 42A and the sulfuric acid supply tubes 51 and 52 having the sulfuric acid discharge ports 51A and 52A in the above-described autoclave 100 are determined based on the following simulation so as to satisfy three conditions of:

(1) maintaining favorable mixture properties;
(2) ensuring a constant residence time for leaching reaction in a reaction tank; and
(3) avoiding damage to facilities due to acid.

Specific description is as follows.

(Regarding Installation Position of Starting Material Slurry Supply Tube)

In the above-structured autoclave 100, for sufficient advancement of a leaching reaction, maintaining favorable mixing and predetermined residence time are required in the compartment 20A at the upstream end in a shape obtained by coupling a hemisphere and a cylinder. Also, since the flow rate of slurry is larger than those of sulfuric acid or vapor, kinetic energy of the flow of slurry by rotational force of the stirring blades 31A determines a tendency of the flows in the autoclave 100.

Figure 5A:
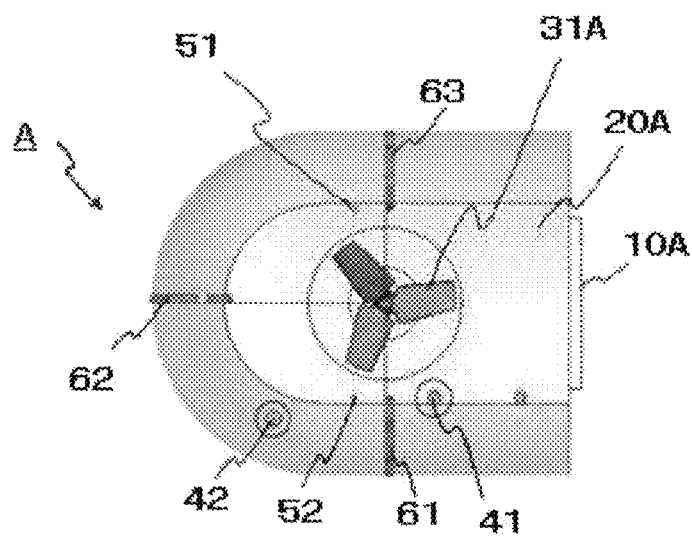
FIG. 5A is a plan view of a model A in which two slurry supply tubes are arranged along a side wall and FIG. 5B is a plan view of a model B in which two slurry supply tubes are arranged along a direction orthogonal to the side wall.
Figure 5B:
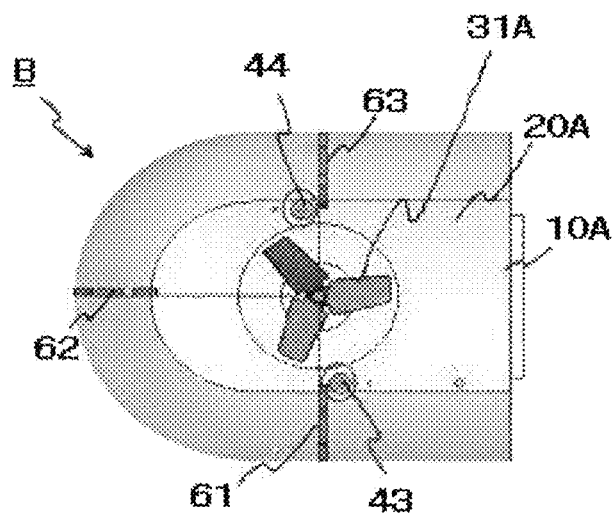

Thus, firstly, to maintain favorable mixing, flows in the compartment 20A at the upstream end in the autoclave 100 were analyzed by simulations regarding a model A in which the two slurry supply tubes 41 and 42 are arranged along the side wall as depicted in FIG. 5A and a model B in which two slurry supply tubes 43 and 44 are arranged along a direction orthogonal to the side wall as depicted in FIG. 5B.

Figure 6B:
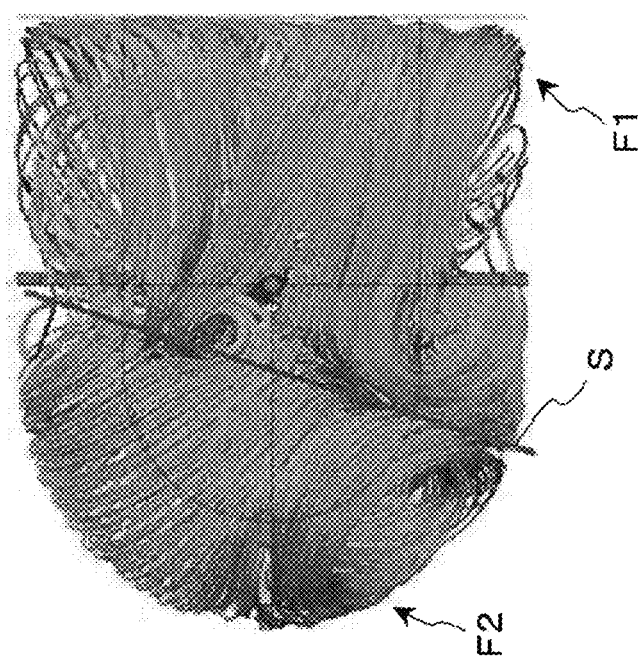
FIG. 6A depicts a state of flows in a compartment at an upstream end viewed from the oblique above and FIG. 6B depicts the state viewed from straight above.
Figure 6A:
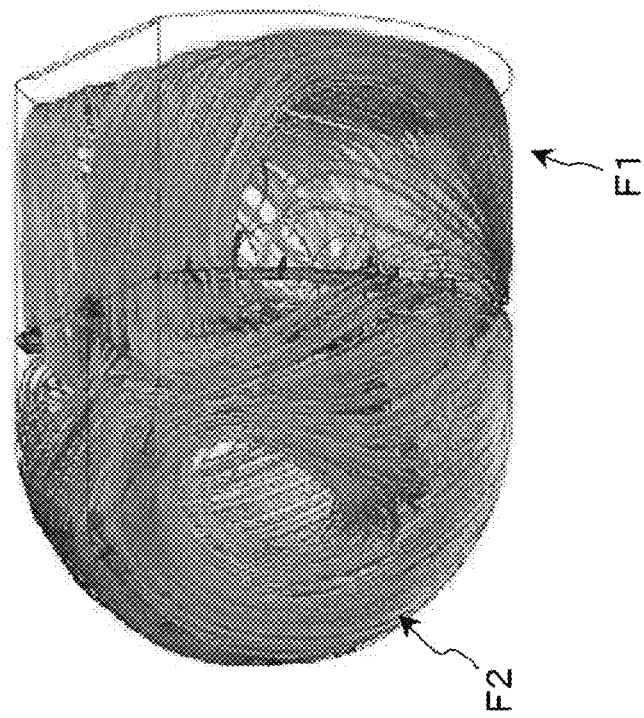

First, FIG. 6A and FIG. 6B depict results of simulations indicated by flow lines which visualize flows created only by rotational force of the stirring blades, with all slurry supply tubes eliminated. As depicted in FIG. 6, two vertically rotating axial flows F1 and F2 are formed, and a plane S formed by a downward flow is positioned slightly close to a hemisphere side by the rotation axis of the stirring blades 31A.

By adding slurry supply tubes to this model, simulations indicated by flow lines which visualize flows in the compartment 20A were performed. The results are depicted in FIG. 7A and FIG. 7B. As depicted in FIG. 7, it can be found that, with a buffle-like effect of the pipes, the plane S formed by a downward flow is moved near a plane including the rotation axis of the stirring blades 31A.

Therefore, from this, it is required to stabilize the two large axial flows F1 and F2 occurring on the hemisphere side and a partition wall side.

The above-described FIG. 6A and FIG. 6B and FIG. 7A and FIG. 7B depict a state of flows in the compartment 20A at the upstream end viewed from the oblique above (A) and the state viewed from straight above (B). Also, a tendency of the flows of slurry is substantially determined by the positions where the slurry supply tubes are arranged.

Next, for the model A depicted in FIG. 5A described above, a simulation was performed as indicated by a flow line which visualizes a flow of slurry in the compartment 20A. The results are depicted in FIG. 8A and FIG. 8B.

Figure 8A:
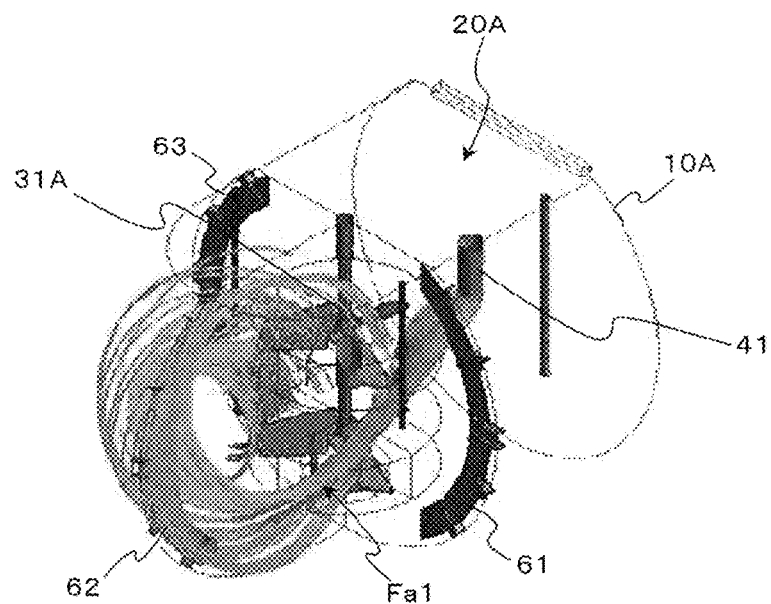
FIG. 8A depicts a state in which slurry is let flow from a slurry supply tube on a partition wall side and FIG. 8B depicts a state in which slurry is let flow from a slurry supply tube on a hemisphere side.
Figure 8B:
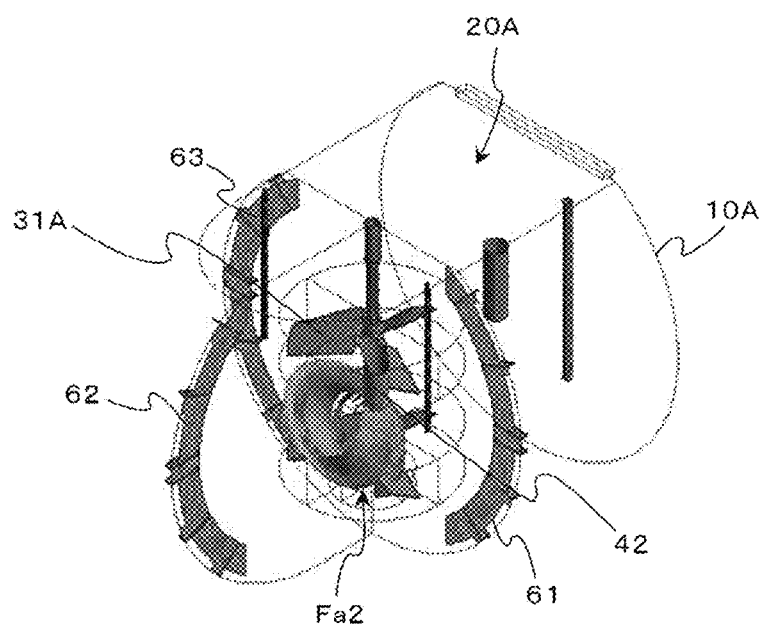

As depicted in FIG. 8A, in the case of the model A, when slurry is let flow from the slurry supply tube 41 on the partition wall 10A side, a large flow passing through a space between the stirring blades 31A and buffles and heading for a portion near a buffle 62 of the hemisphere part. Also, as depicted in FIG. 8B, the slurry supply tube 42 on the hemisphere side creates a rotational flow in the hemisphere portion. Slurry let flow form this slurry supply tube 42 appears to stay in the hemisphere part, and the strong axial flow F2 is present on its perimeter as depicted in FIG. 6A and FIG. 6B described above. Therefore, stable flows of slurry can be obtained by adjusting the position of the slurry supply tube 42.

Figure 9:
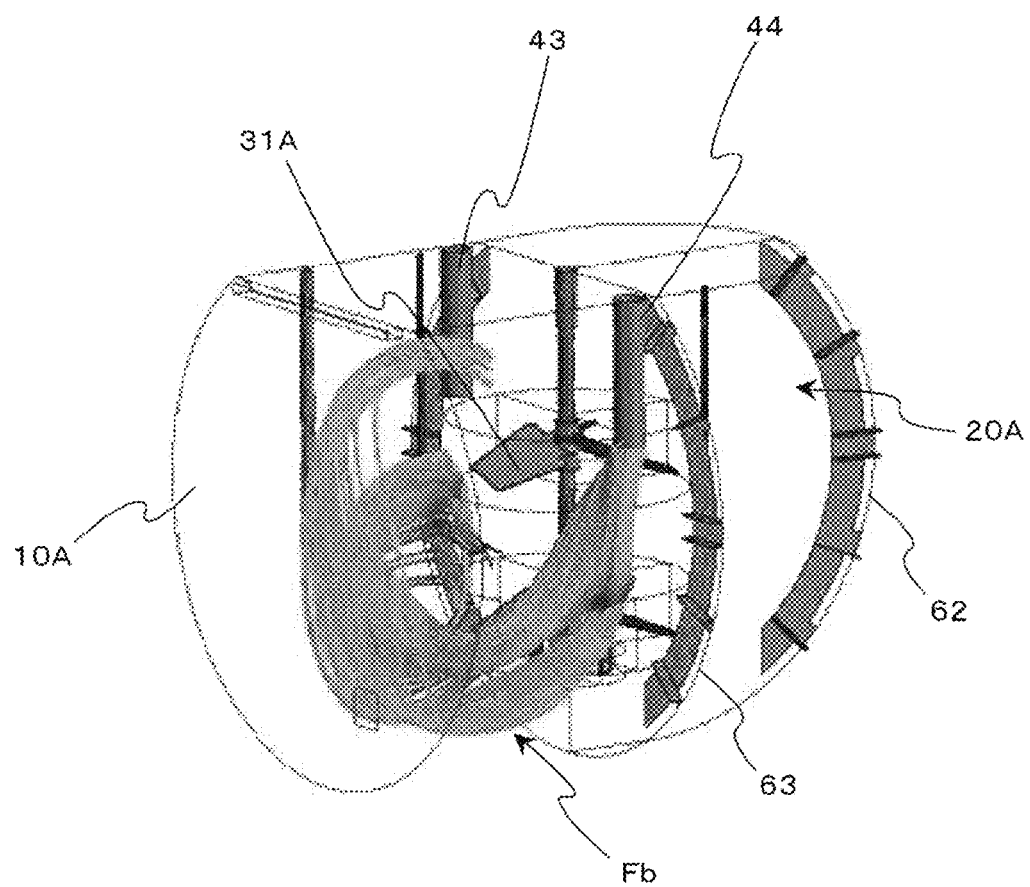
FIG. 9 is a schematic view of results of a simulation indicated by flow lines which visualize flows of slurry in the compartment at the upstream end.

By contrast, the results of a simulation indicated by flow lines which visualize flows in the compartment 20A for the model B depicted in FIG. 5B described above are depicted in FIG. 9. As depicted in FIG. 9, a slurry supply tube 44 interposed on an opposite side of the side wall where the above-described slurry supply tubes 41 and 42 creates a flow of slurry heading for the partition wall 10A side. Slurry let flow from this slurry supply tube 44 becomes a flow that approaches and then directly collide with the partition wall 10A, thereby leading to a short path of slurry. Therefore, it is not preferable to arrange the slurry supply pipe 44 as in the model B.

Next, in the autoclave 100 structured as described above, a simulation was performed as follows regarding a residence time in the compartment 20A at the upstream end required for sufficient advancement of a leaching reaction.

That is, as for the models A and B depicted in FIG. 5A and FIG. 5B described above, a colored fluid for a predetermined time (here, one second) was let flow, and residence time distribution curves obtained by plotting concentrations of the fluid which reached a tank exit were calculated. The calculation results are depicted in FIG. 10A, FIG. 10B, FIG. 11A, and FIG. 11B.

Figure 10A:
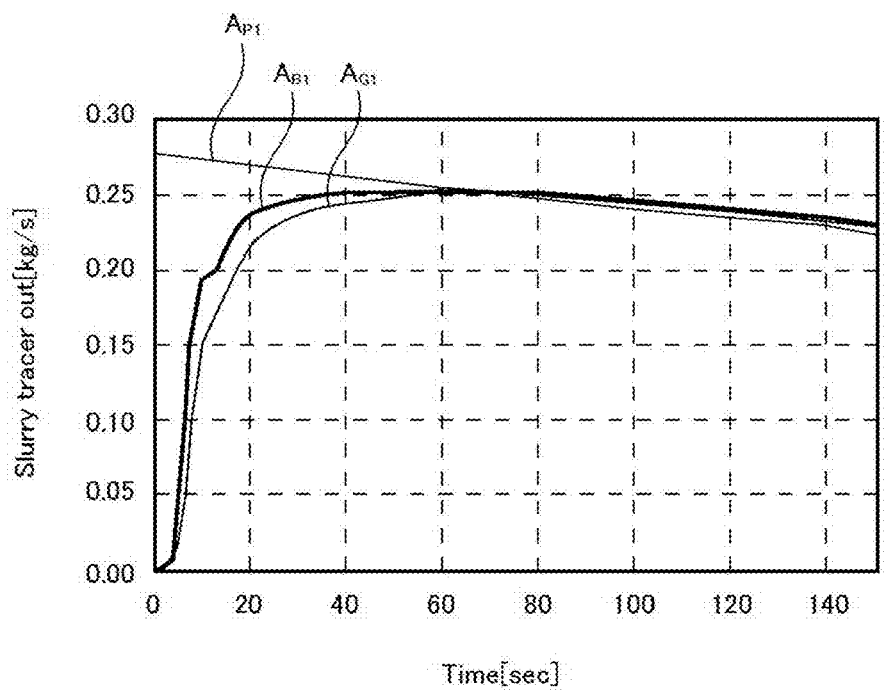
FIG. 10A depicts results obtained by calculating residence time distribution curves of slurry in the above-described model A.
Figure 10B:
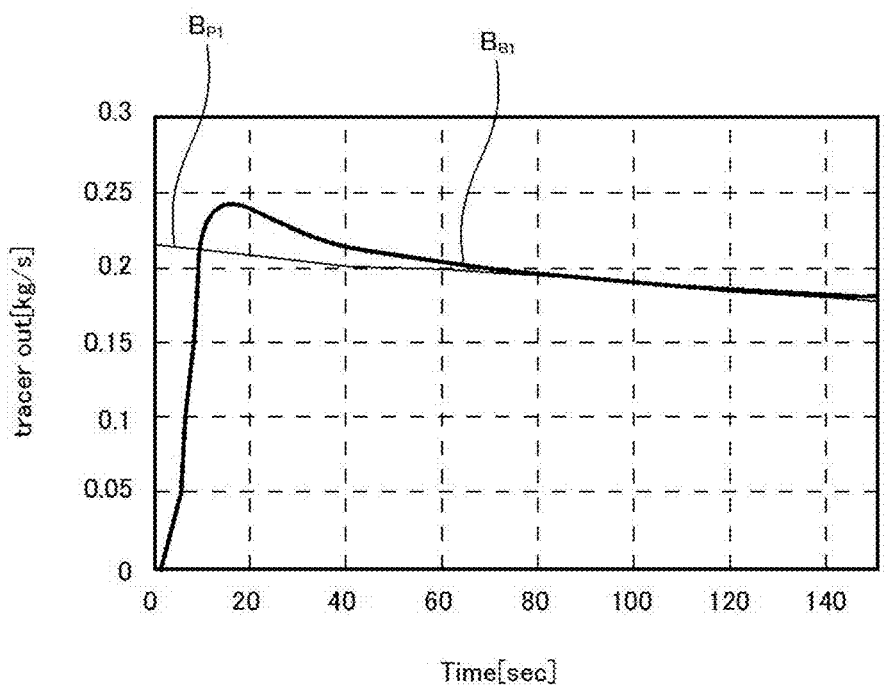
FIG. 10B depicts results obtained by calculating residence time distribution curves of slurry in the above-described model B.

Note that FIG. 10A depicts a residence time distribution from an entrance to an exit of slurry in the model A. In this FIG. 10A, a distribution curve AP1 indicates logical values of a residence time distribution of slurry predicted in a complete mixing model, a distribution curve AB1 indicates a residence time distribution of slurry when the sulfuric acid supply tubes are short, and a distribution curve AG1 indicates a residence time distribution of slurry when the sulfuric acid supply tubes are long. Also, FIG. 10B depicts a residence time distribution from the entrance to the exit of slurry in the model B by using a distribution curve BB1. Note that a distribution curve BP1 indicates logical values of a residence time distribution predicted in the complete mixing model.

Figure 11A:
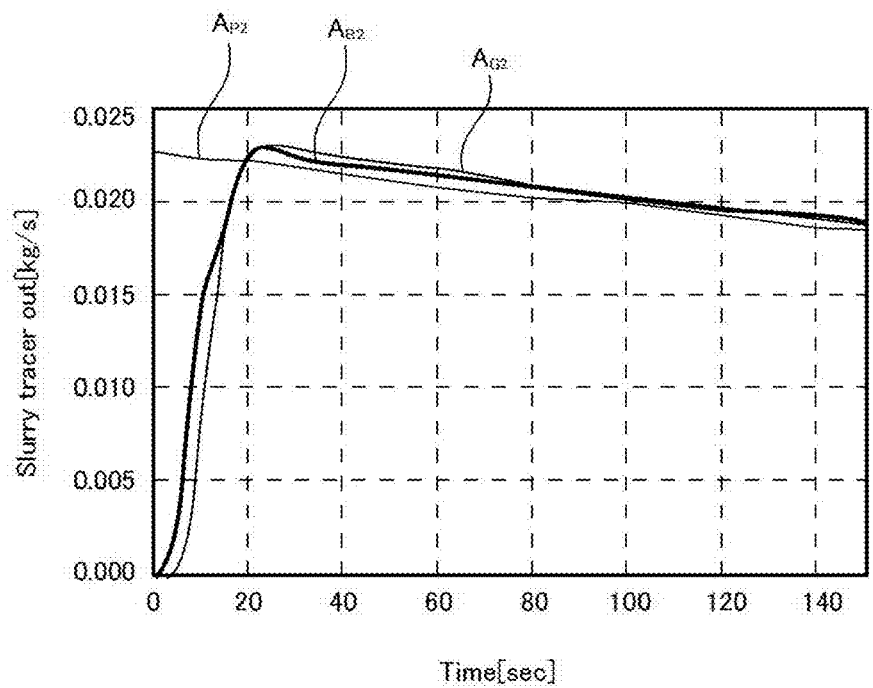
FIG. 11A depicts results obtained by calculating residence time distribution curves of sulfuric acid in the above-described model A.
Figure 11B:
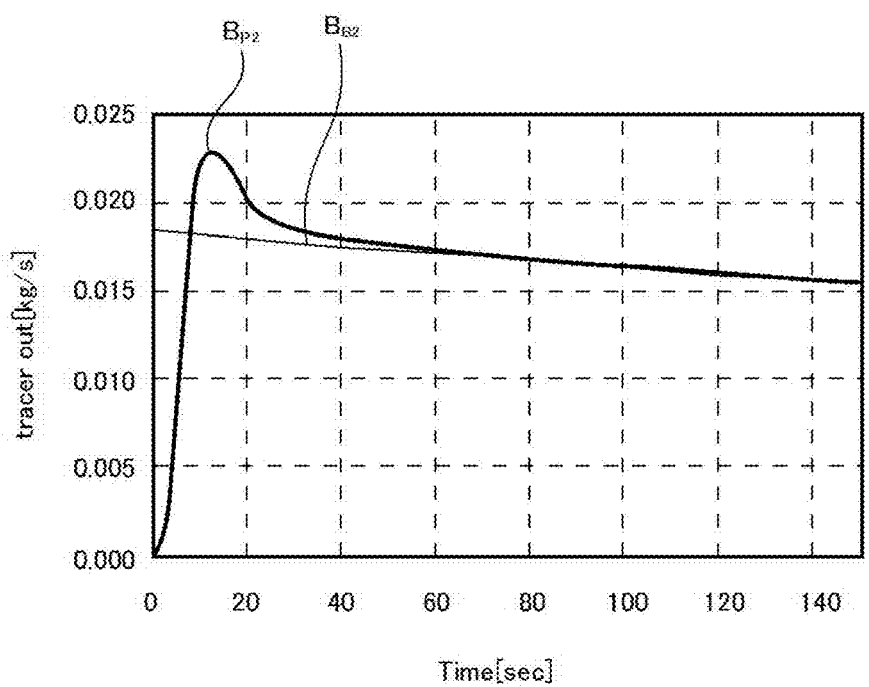
FIG. 11B depicts results obtained by calculating residence time distribution curves of sulfuric acid in the above-described model B.

Also, FIG. 11A depicts a residence time distribution from an entrance to an exit of sulfuric acid in the model A. In this FIG. 11A, a distribution curve AP2 indicates logical values of a residence time distribution of sulfuric acid predicted in the complete mixing model, a distribution curve AB2 indicates a residence time distribution of sulfuric acid when the sulfuric acid supply tubes are short, and a distribution curve AG2 indicates a residence time distribution of sulfuric acid when the sulfuric acid supply tubes are long. Also, FIG. 11B depicts a residence time distribution from the entrance to the exit of sulfuric acid in the model B by using a distribution curve BB2. Note that a distribution curve BP2 indicates logical values of a residence time distribution predicted in the complete mixing model.

As depicted in FIG. 10A and FIG. 10B and FIG. 11A and FIG. 11B, compared with the logical values of the residence time distributions predicted in the complete mixing model indicated by the distribution curves AP1, BP1, AP2, and BP2, high concentration is observed in both of slurry and sulfuric acid in an early time zone (10 seconds to 30 seconds) in the model B. By contrast, in the model A, a concentration higher than the above-described logical values is not observed in an early time zone.

Also, as for the models A and B, simulations indicated by flow lines which visualize flows in the compartment 20A were performed, the flow lines were colored according to elapsed time of the flows of slurry, and residence times of slurry near the partition wall were compared. The results are depicted in FIG. 12A and FIG. 12B.

Figure 12A:
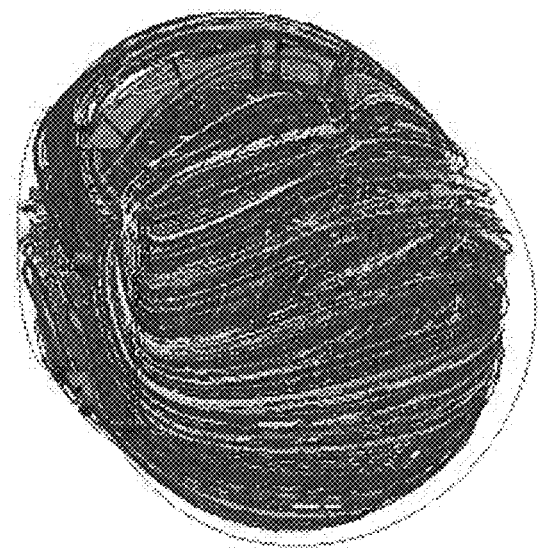
FIG. 12A depicts residence times of slurry near the partition wall of the above-described model A and FIG. 12B depicts residence times of slurry near the partition wall of the above-described model B.

Note that FIG. 12A depicts residence times of slurry near the partition wall 10A of the model A. Also, FIG. 12B depicts residence times of slurry near the partition wall 10A of the model B. Furthermore, in FIG. 12A and FIG. 12B, red r indicates a residence time equal to or shorter than fifteen seconds, and blue b indicates a residence time equal to or longer than thirty seconds.

Figure 12B:
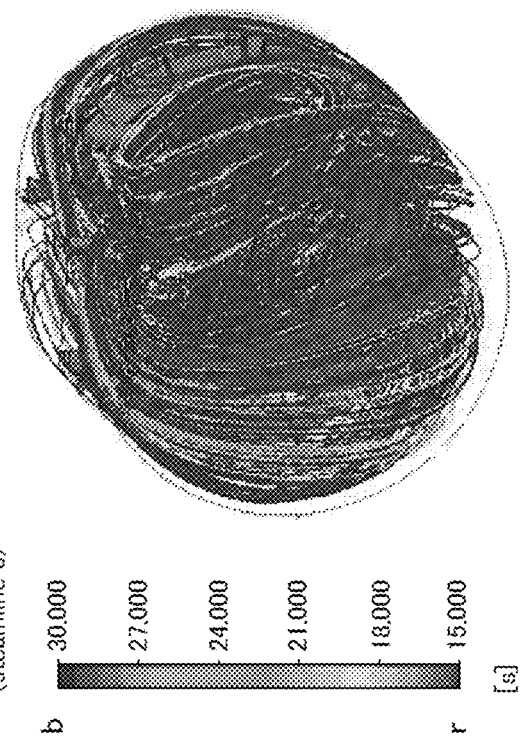

As depicted in FIG. 12A and FIG. 12B, it can be found that FIG. 12B has a red portion larger than that of FIG. 12A, meaning that there is a relatively lot of slurry approaching a partition wall 10A portion fifteen seconds or shorter in the model B.

Also from these simulation results, it can be found the arrangement of the slurry supply tube 44 in the model B where there is a possibility that slurry directly flows near the partition wall is not preferable.

Figure 13:
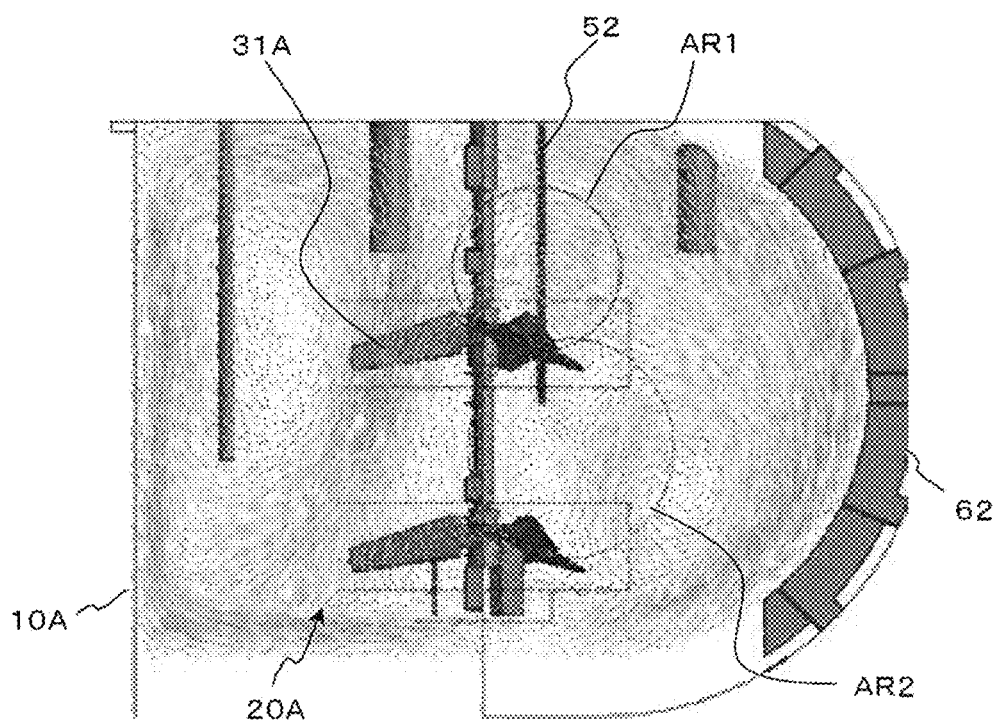
FIG. 13 is a vector diagram obtained as a result of a simulation of flows at a section where the sulfuric acid supply tube is installed.

Furthermore, FIG. 13 depicts a vector diagram obtained as a result of a simulation of flows at a cross-section where the sulfuric acid supply tube 51 is installed.

As depicted in the vector diagram of FIG. 13, it can be found that while a small swirl crosses each other in an area AR1 near the opening, a stable flow toward the direction of the partition wall 10A is viewed in an upper area AR2 of the opening.

(Regarding Installation Positions of Sulfuric Acid Supply Tubes)

Next, the installation positions of a sulfuric acid supply tubes is studied. For this study, in view of the possibility of damage to the partition wall 10A by sulfuric acid supplied from the sulfuric acid supply tubes, a simulation was performed for the above-described models A and B in which flow lines near the partition wall 10A were colored by sulfuric acid concentration for comparison.

The simulation results are depicted in FIG. 14A and FIG. 14B. Note that FIG. 14A depicts sulfuric acid concentrations near the partition wall 10A in the above-described model A. FIG. 14B depicts sulfuric acid concentrations near the partition wall 10A in the above-described model B.

As depicted in FIG. 14A and FIG. 14B, although there is a slight difference in concentration, it has been revealed from the results of this simulation that the model A is superior to the model B regarding the installation position of the sulfuric acid supply tube.

Thus, in the above-described autoclave 100, with the above-described starting material slurry discharge ports 41A and 42A arranged as in the above-described model B and the sulfuric acid discharge ports 51A and 52A arranged as in the model A, these ports are alternately disposed on the perimeter of the stirring blades 31A of the stirring machine provided to the above-described compartment 20A, thereby causing starting material slurry and sulfuric acid to be alternately drawn toward the stirring blades 31A to increase the possibility of a contact and proceed mixing more efficiently than ever.

(Regarding Length of Sulfuric Acid Supply Tubes)

Next, the length of the sulfuric acid supply tubes is studied. First, simulations of flows of sulfuric acid were performed in a model C including long sulfuric acid supply tubes 51L and 52L and in a model D including short sulfuric acid supply tubes 51S and 52S, with the number of revolutions of the stirring blades 31A being set at 60.5 rpm. The results are depicted in FIG. 15A and FIG. 15B.

Figure 15A:
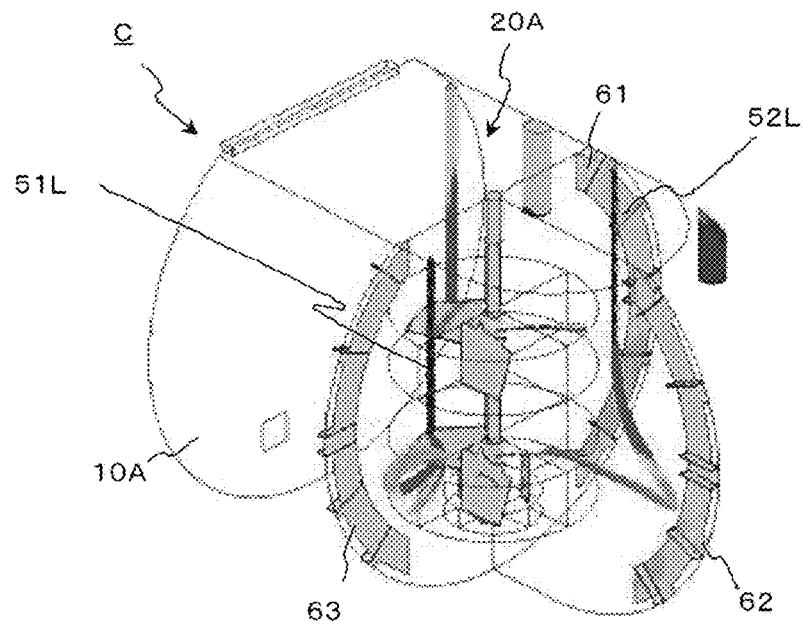
FIG. 15A depicts flows of sulfuric acid in the model C and FIG. 15B depicts flows of sulfuric acid in the model D.
Figure 15B:
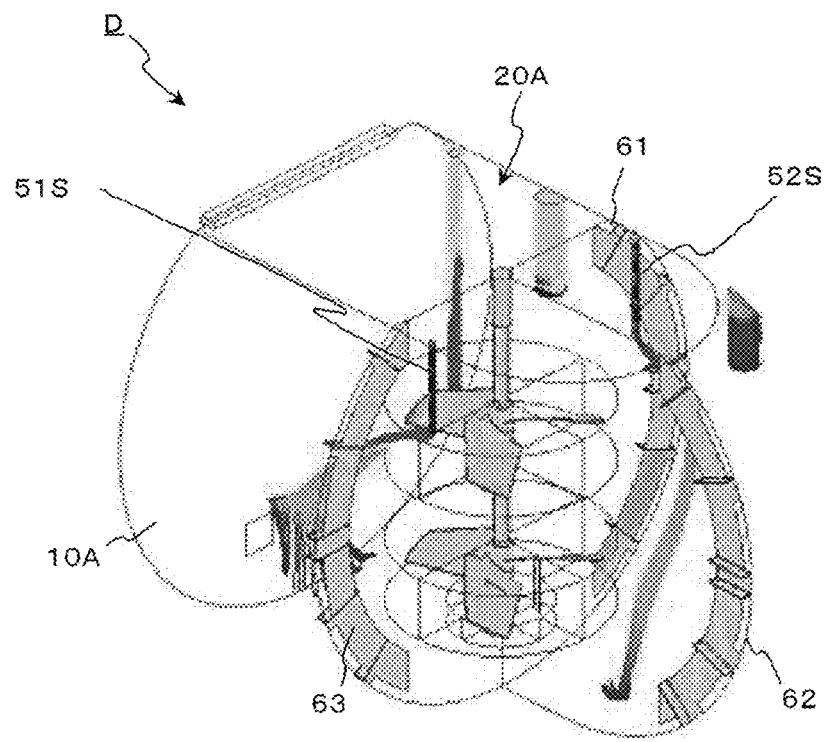

As depicted in FIG. 15A, it has been revealed that sulfuric acid stays in a swirl shape near the exits of the sulfuric acid supply tubes 51L and 52L in the model C with the long sulfuric acid supply tubes 51L and 52L and sulfuric acid smoothly flows in the direction of the partition wall 10A in the model D with the short sulfuric acid supply tubes 51S and 52S as depicted in FIG. 15B.

Figure 16:
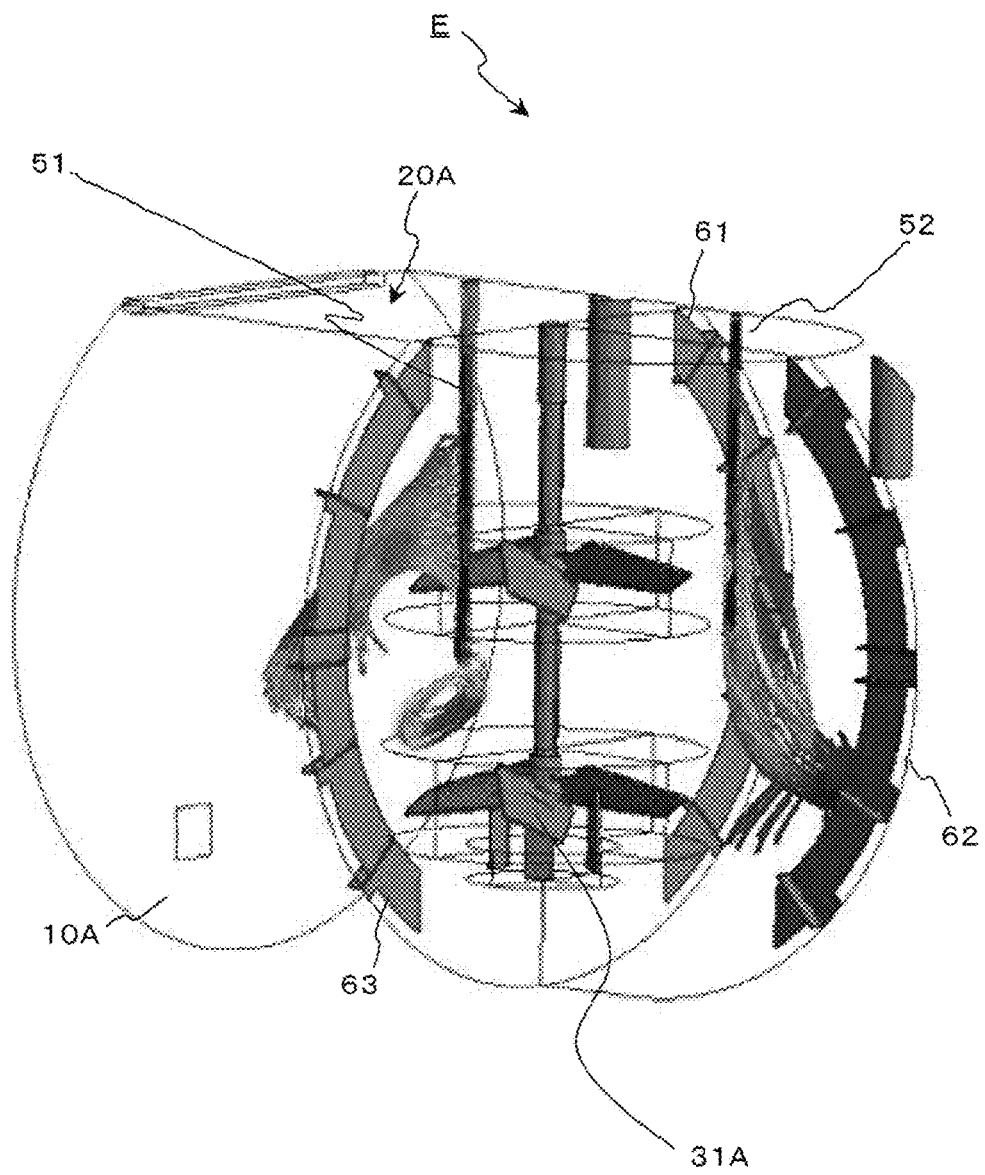
FIG. 16 is a diagram depicting results of a simulation of flows of sulfuric acid in a model E including sulfuric acid supply tubes slightly longer than the short sulfuric acid supply tubes, with the number of revolutions of the stirring blades being set at 60.5 rpm.

And, it has been revealed that flows of sulfuric acid in a model E including the sulfuric acid supply tubes 51 and 52 slightly longer than the short sulfuric acid supply tubes 51S and 51S can be improved as depicted in FIG. 16 by arranging the sulfuric acid discharge ports 51A and 52A of the sulfuric acid supply tubes 51 and 52 at slurry-stable downstream positions.

Also, it has been conventionally confirmed that the flow of sulfuric acid moves as approaching a buffle or a tank wall due to fluctuations in the flow of sulfuric acid with the rotation of the stirring blades 31A. Therefore, influences of fluctuations in the flow of sulfuric acid were verified. However, since a non-stationary analysis required to reproducing fluctuations in the flow takes extremely long time, increases in temperature at a relevant portion were observed with stationary calculation as approximate calculation.

While there were no problems in a normal operation state, when stability with respect to fluctuations in flow rate conditions and operation conditions were investigated, a decrease was observed in which a buffle temperature was increased in the model D including short sulfuric acid supply tubes 51S and 52S when the number of revolutions of the stirring blades 31A was small.

Figure 17A:
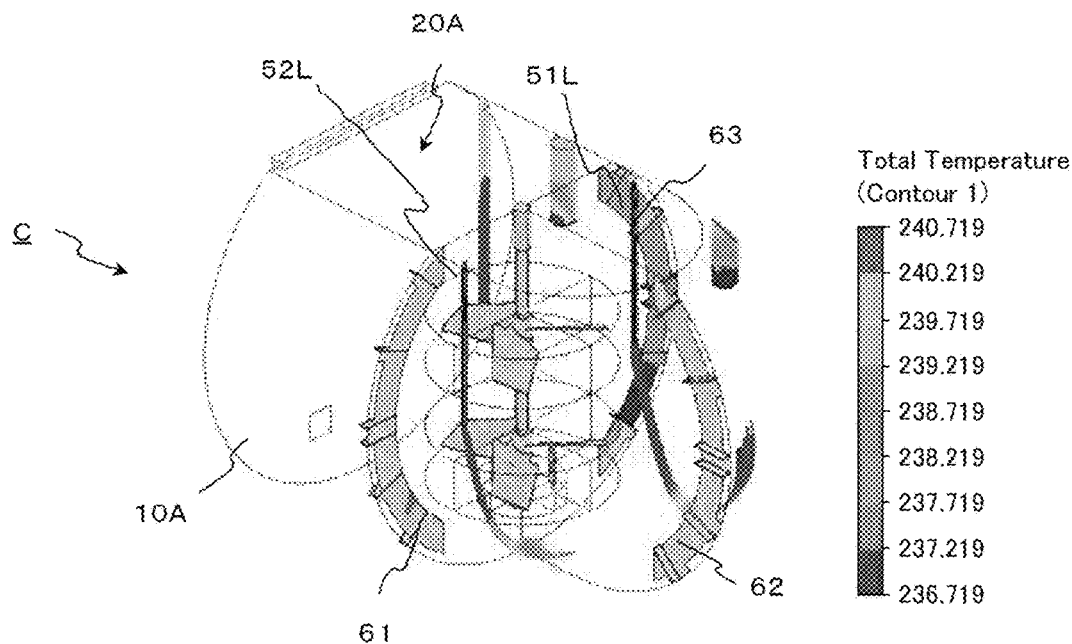
FIG. 17A depicts temperature contours of the buffles and the stirring blades with the number of revolutions of the stirring blades being set at 42.4 rpm in the model C
Figure 17B:
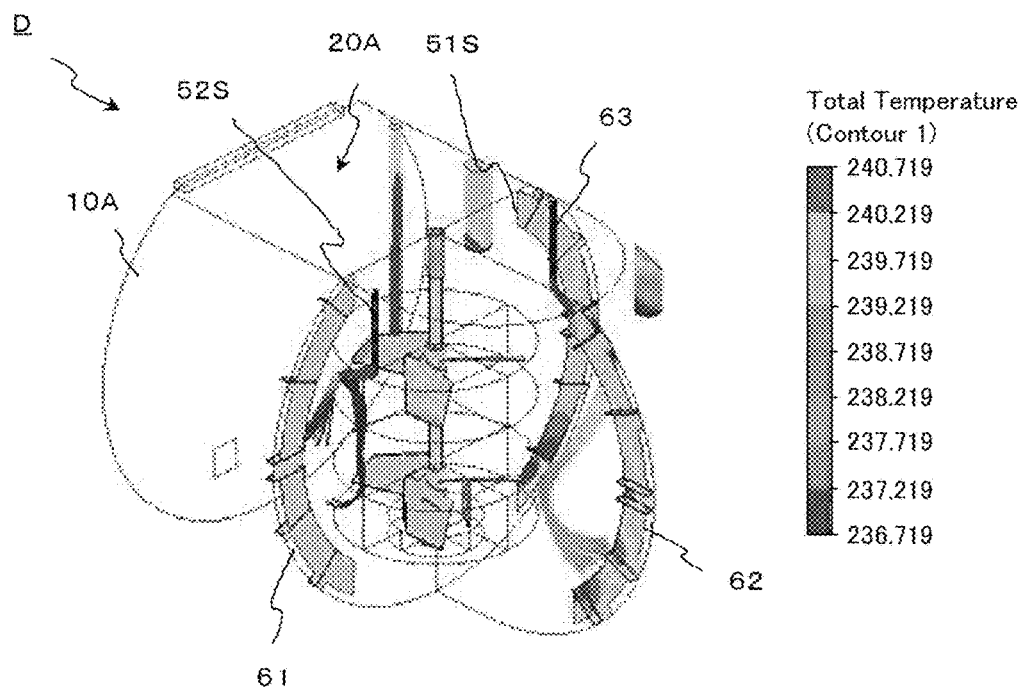
FIG. 17B depicts temperature contours of the buffles and the stirring blades with the number of revolutions of the stirring blades being set at 42.4 rpm in the model D.
Figure 18:
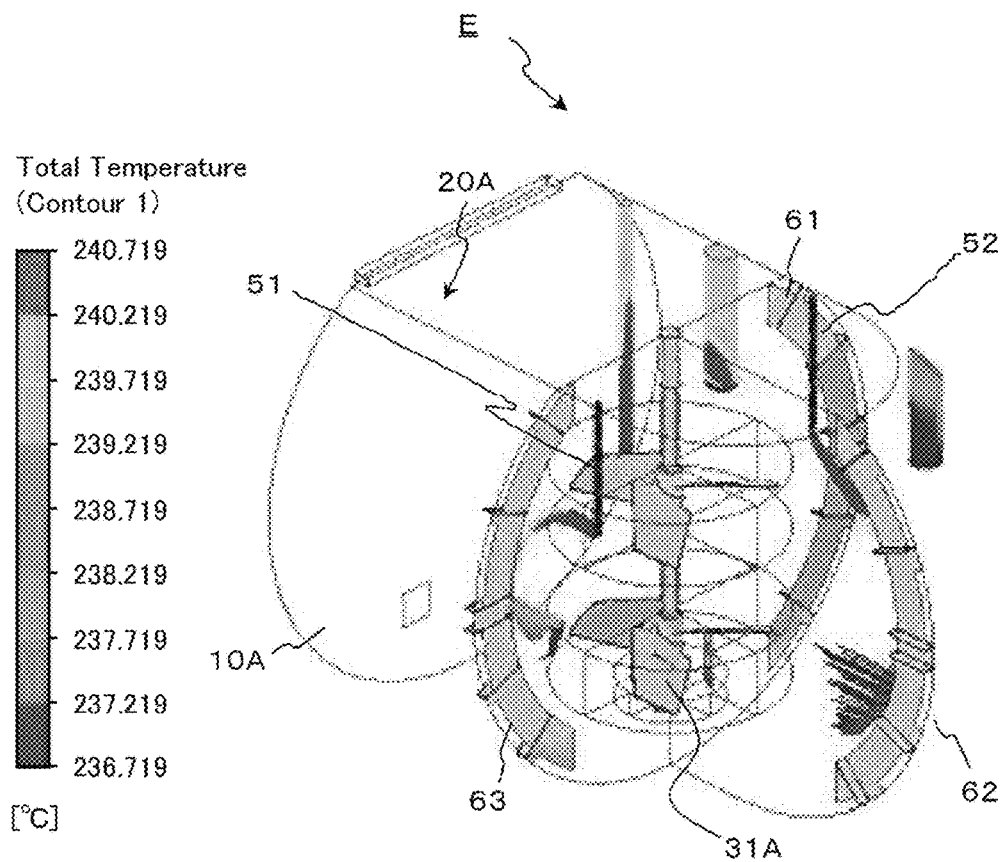
FIG. 18 is a diagram depicting temperature contours of the buffles and the stirring blades with the number of revolutions of the stirring blades being set at 60.5 rpm in the model E including the sulfuric acid tubes slightly longer than the short sulfuric acid supply tubes.
Figure 19:
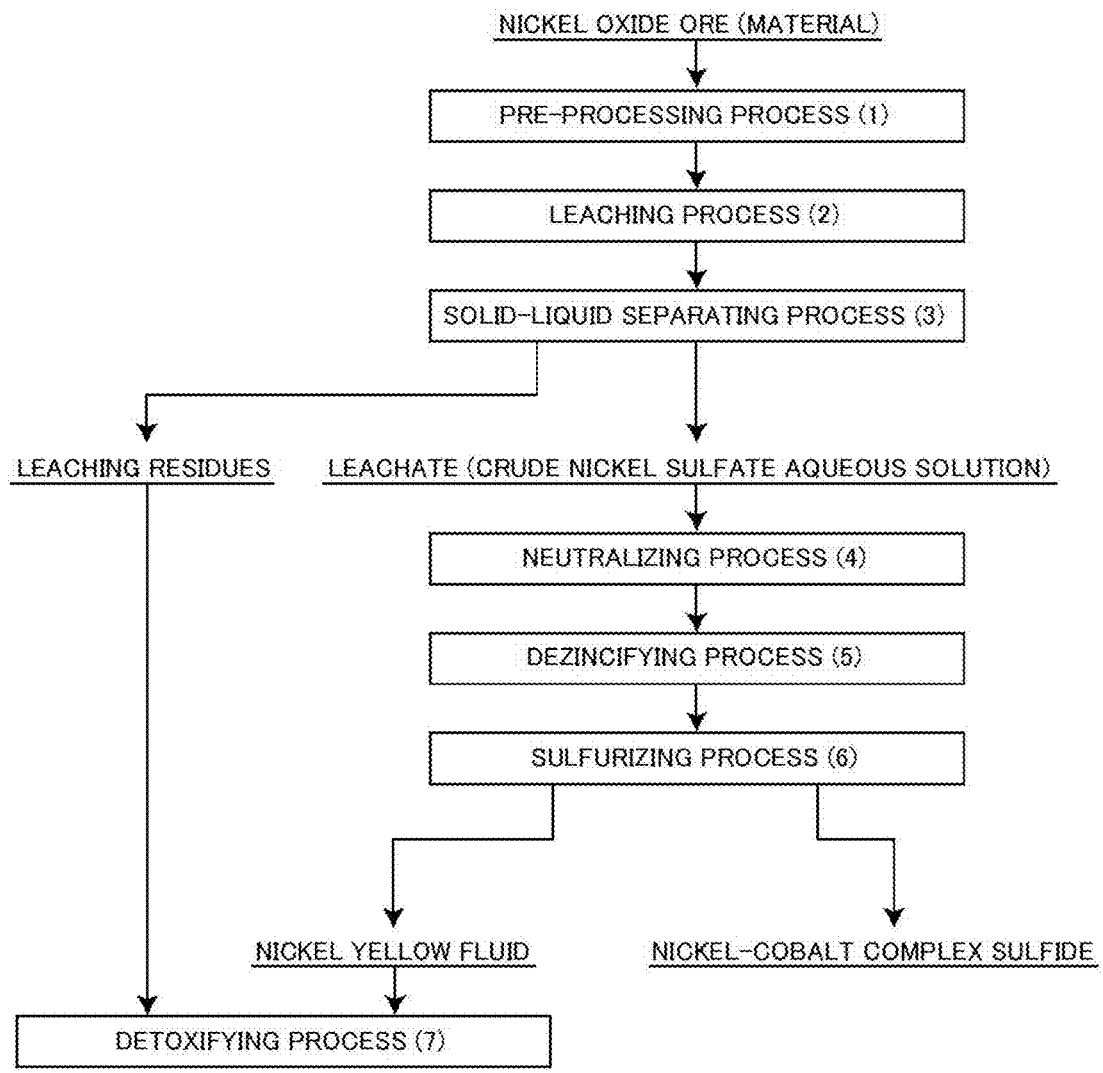
FIG. 19 is a process diagram depicting a procedure of leaching nickel and cobalt by a high pressure acid leaching method for nickel oxide ore.

Here, temperature contours of the buffles and the stirring blades 31A depending on the length of the sulfuric acid supply tubes 51 and 52 are depicted in FIG. 17A, FIG. 17B, and FIG. 18. Note that FIG. 17A depicts temperature contours of the buffles 61 to 63 and the stirring blades 31A with the number of revolutions of the stirring blades 31A being set at 42.4 rpm in the model C including the long sulfuric acid supply tubes 51L and 52L. Also, FIG. 17B depicts temperature contours of the buffles 61 to 63 and the stirring blades 31A with the number of revolutions of the stirring blades 31A being set at 42.4 rpm in the model D including the short sulfuric acid supply tubes 51S and 52S.

As depicted in FIG. 17A and FIG. 17B, in the model D with the short sulfuric acid supply tubes 51S and 52S described above, even when the number of revolution of the stirring blades 31A is 60.5 rpm, part of sulfuric acid is directly drawn to an upper part of the stirring blades, and a slight increase in temperature is observed at the buffle of the hemisphere part. Therefore, as for the model E with the sulfuric acid supply tubes 51 and 52 slightly longer than the short sulfuric acid supply tubes 51S and 52S so that the supply ports of sulfuric acid were positioned near the upper surface of the upper part of the stirring blades, buffle temperatures of the hemisphere part with the number of revolutions of the stirring blades being set at 60.5 rpm were checked. As a result, the results as depicted in FIG. 18 were obtained. That is, compared with the model with the short sulfuric acid supply tubes 51S and 52S depicted in FIG. 15B, it has been revealed that an increase in temperature of the buffle in the hemisphere part was decreased and sulfuric acid was not directly drawn to the upper part of the stirring blades.

Thus, in the above-described autoclave 100, starting material slurry and sulfuric acid are added to the above-described compartment 20A at the upstream end from the above-described starting material slurry discharge ports 41A and 42A and the sulfuric acid discharge ports 51A and 52A positioned at positions higher than the uppermost part of the above-described stirring blades 31A and lower than the contained liquid surface L via the two starting material slurry supply tubes 41 and 42 having the starting material slurry discharge ports 41A and 42A, respectively, and the two sulfuric acid supply tubes 51 and 52 having sulfuric acid discharge ports 51A and 52A, respectively, alternately disposed on the perimeter of the stirring blades 31A of the stirring machine 31 provided in the compartment 20A at the upstream end as described above.

As such, in the autoclave 100 in which starting material slurry and sulfuric acid are added from the above-described starting material slurry discharge ports 41A and 42A and sulfuric acid discharge ports 51A and 52A to the compartment 20A at the upstream end, in particular, in the case of a nickel oxide ore process, due to mixture of conditions such as solid contents and viscosity of starting material slurry and the temperature of the autoclave, starting material slurry and sulfuric acid are alternately drawn toward the stirring blades 31A to increase the possibility of a contact. Therefore, mixing is proceeded more efficiently than ever to improve a leaching ratio. Also, a contact of high-concentration sulfuric acid with a wall surface can be prevented to decrease damage to the wall surface due to a contact of high-concentration sulfuric acid.

Conventionally, a predetermined leaching ratio of 90% to 95% cannot be maintained unless the concentration of free sulfuric acid of the leachate is set at 50 g/L to 55 g/L. By contrast, in the above-described autoclave 100, the predetermined leaching ratio can be maintained even if the concentration of free sulfuric acid of the leachate is set at 45 g/L to 50 g/L.

Here, the relation of the positions of the above-described starting material slurry discharge ports 41A and 42A and sulfuric acid discharge ports 51A and 52A with the autoclave 100 is not particularly limited, and any positions can be selected by rotation based on the center of the stirring blades 31A of the stirring machine 30A provided in the compartment 20A at the upstream end.

Note that while the above-described starting material slurry discharge ports 41A and 42A and the above-described sulfuric acid discharge ports 51A and 52A are alternately drawn in a similar manner when they are positioned outside the above-described defined ranges S1, S2, S3, and S4, their dense flows are too close to or too far away from each other, thereby causing decreased mixing efficiency, which is undesirable.

Also, in this autoclave 100, the direction of the bottom side of the above-described regular triangle T is set parallel with the side wall of the autoclave 100. With this, since the starting material slurry discharge ports 41A and 42A are positioned in parallel with the side wall of the autoclave, relatively short piping suffices. Furthermore, since the degree of crossing and overlapping at the time of piping installation is minimum, operation is simple, which is preferable.

EXAMPLES

Example 1

Operation was performed with a pressure in the autoclave of 5.5 MPaG, a temperature of 250 degrees Celsius, an Ni grade in crystal of 1.0% to 1.4%, and an amount of slurry influx to the autoclave of 300 m$^3$ to 700 m$^3$ per hour. Here, ore slurry and sulfuric acid were supplied by applying the present invention.

As a result, the leaching ratio of nickel was 92.5%. Also, operation was possible herein with the concentration of free sulfuric acid of the leachate being managed at 45 g/L to 50 g/L.

Comparative Example 1

Figure 20A:
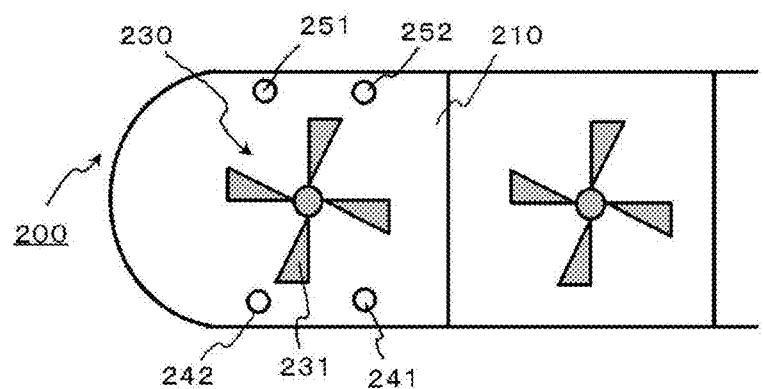
FIG. 20A is a plan view schematically depicting the inner structure of the autoclave as being horizontally cut.
Figure 20B:
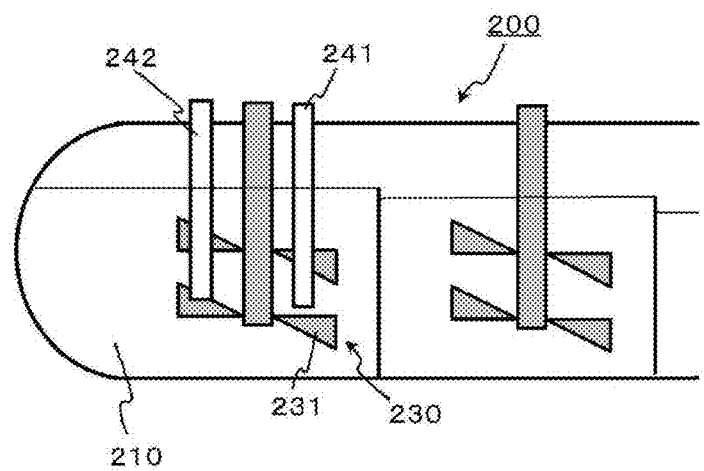
FIG. 20B is a side view schematically depicting the inner structure of the autoclave as being vertically cut.
Figure 20C:
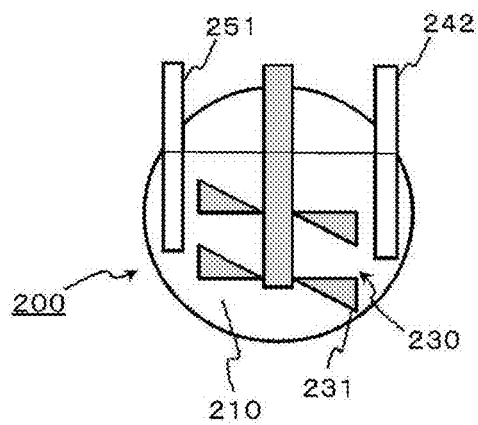
FIG. 20C is a front view schematically depicting the inner structure of the autoclave as being vertically cut.

Without applying the present invention, operation was performed similarly to that of Example 1 except that present invention was not applied and ore slurry and sulfuric acid were supplied in conventional method in the conventional autoclave depicted in FIG. 20.

As a result, the leaching ratio of nickel was 92.0%. However, the above-described leaching ratio was not able to be maintained unless the concentration of free sulfuric acid of the leachate was managed at 50 g/L to 55 g/L.

REFERENCE SIGNS LIST 10A, 10B partition wall; 20A, 20B compartment; 30A, 30B . . . stirring machine; 31A stirring blade; 41, 42 . . . starting material slurry supply tube; 41A, 42A starting material slurry discharge port; 51, 52 sulfuric-acid supply tube; 51A, 52A . . . sulfuric-acid discharge port; 100 autoclave

The invention claimed is:

1. An autoclave in which heated and pressurized starting material slurry and sulfuric acid are stirred by a stirring machine provided in each compartment in the autoclave and having a plurality of partition walls wherein the slurry is transferred from a compartment on a upstream side of the autoclave to a compartment on a downstream side of the autoclave, wherein:
starting material slurry supply tubes having starting material slurry discharge ports and sulfuric acid supply tubes having sulfuric acid discharge ports are provided in the compartment on the upstream side,
the starting material slurry discharge ports and the sulfuric acid discharge ports are (i) alternately positioned around a rotating direction of a plurality of stirring blades, (ii) disposed higher than an uppermost part of the stirring blades and lower than a contained liquid surface, and (iii) positioned at planar positions around apex positions of a regular triangle and a midpoint of a bottom side of the regular triangle, the regular triangle having a height set to a diameter D of a circle formed by tips of the stirring blades,
the regular triangle is disposed at a distance of 0 D to 0.5 D from the diameter of the circle such that the midpoint of the bottom side of the regular triangle is on a downstream side of the rotating direction of the stirring blades,
the starting material slurry discharge ports are positioned within a distance of 0.25 D from the apex positions on the bottom side of the regular triangle, and
the sulfuric acid discharge ports are positioned within a distance of 0.25 D from the midpoint and remaining apex position of the regular triangle.

2. A method of mixing in the autoclave according to claim 1 for a high pressure acid leaching process, comprising:
adding starting material slurry and sulfuric acid to the autoclave;
stirring the starting material slurry and sulfuric acid by a stirring machine provided in each compartment in the autoclave to obtain a stirred slurry; and
transferring the stirred slurry from the compartment on the upstream side of the autoclave to the compartment on the downstream side of the autoclave.

3. The method according to claim 2, wherein the length direction of the bottom side of the regular triangle is parallel to a side wall of the autoclave.

4. The autoclave according to claim 1, wherein the length direction of the bottom side of the regular triangle is parallel to a side wall of the autoclave.

* * * * *